Sept. 8, 1931.　　　　P. R. LESLIE　　　　1,821,941
MECHANISM FOR THE MECHANICAL COMPUTATION AND THE RECORDING OF LABOR COSTS
Filed Aug. 23, 1928　　　2 Sheets-Sheet 1
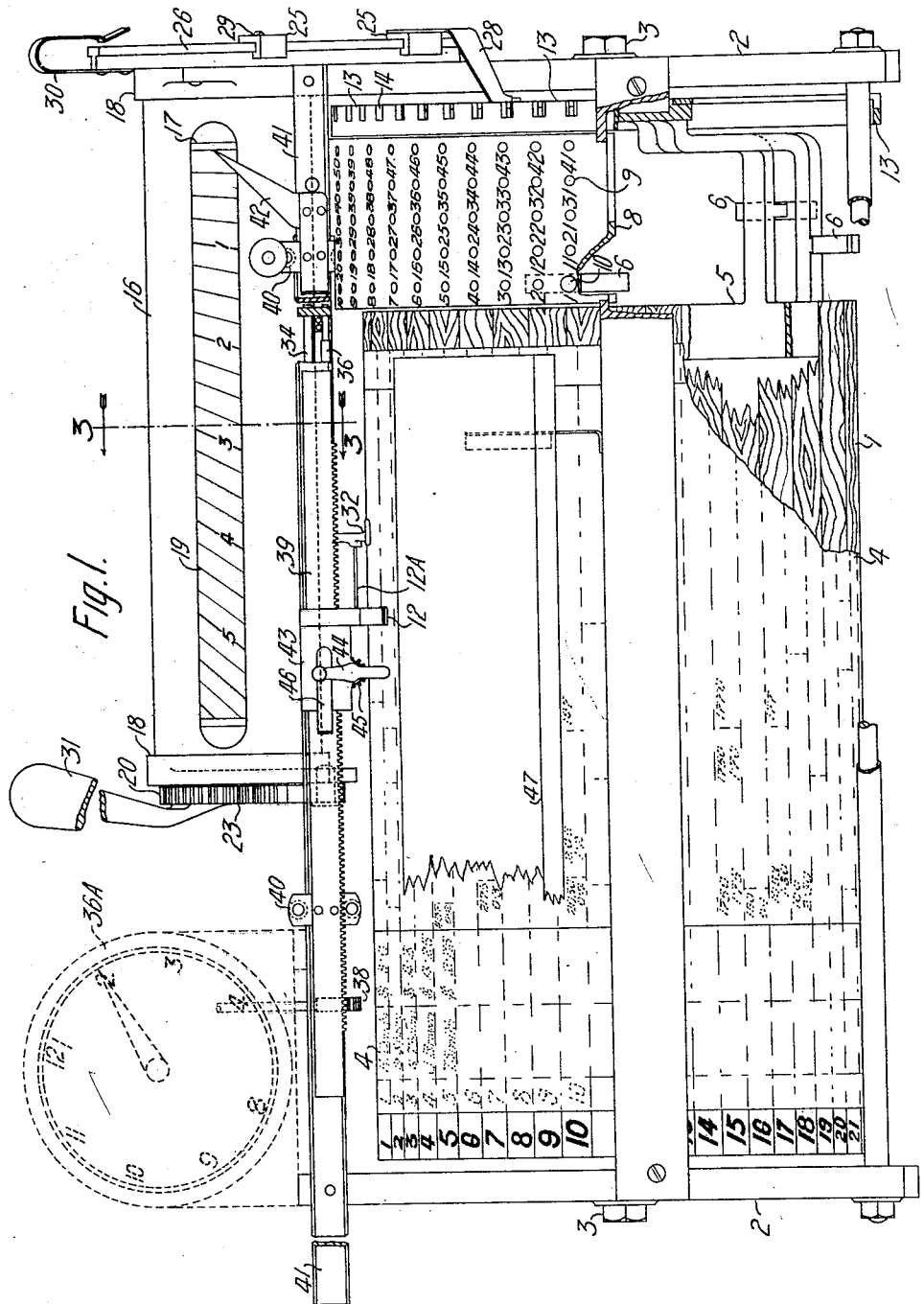
INVENTOR
Percy Robert Leslie
BY Dowell and Dowell
ATTORNEYS Sept. 8, 1931.   P. R. LESLIE   1,821,941
MECHANISM FOR THE MECHANICAL COMPUTATION AND THE RECORDING OF LABOR COSTS
Filed Aug. 23, 1928   2 Sheets-Sheet 2
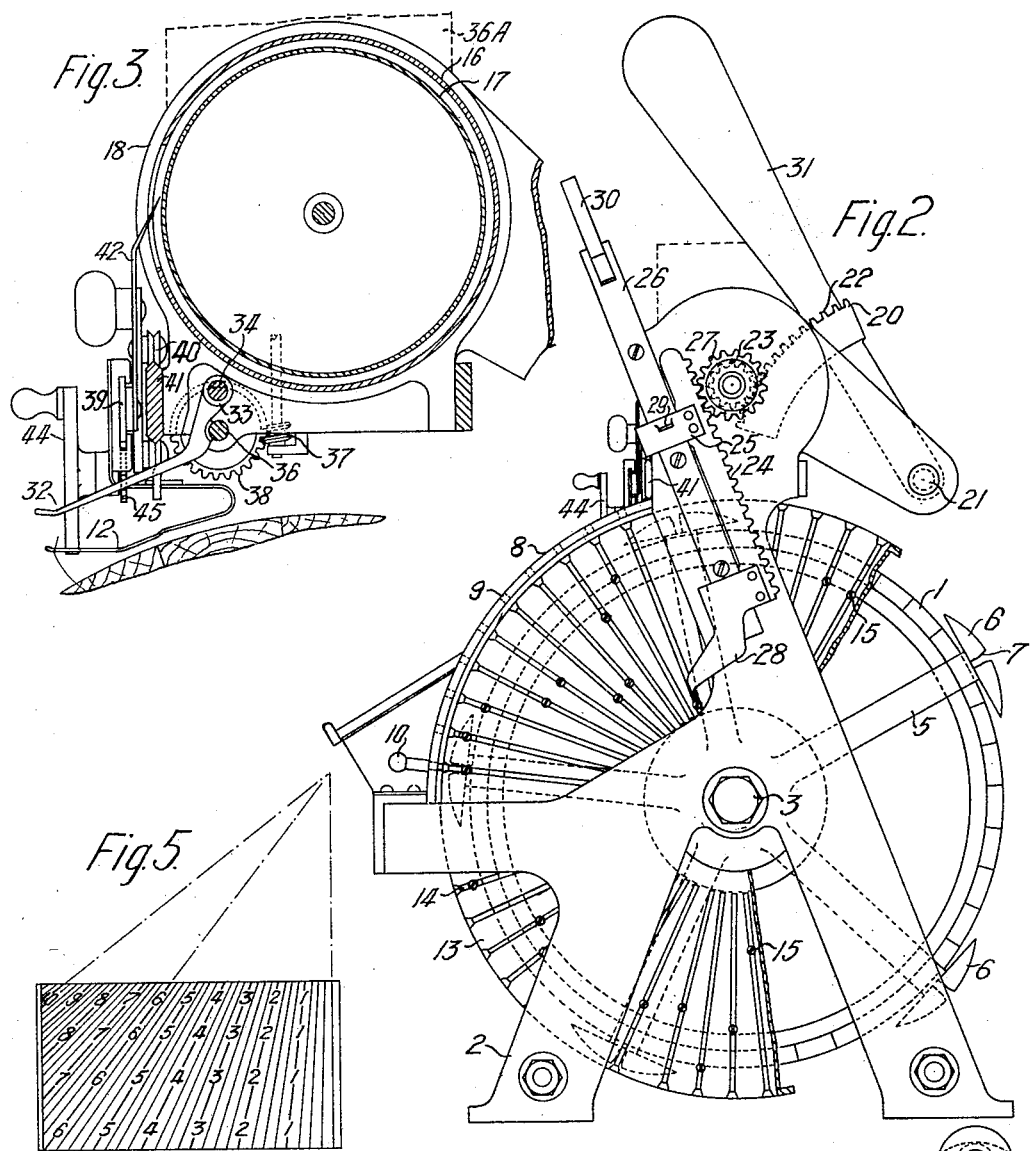
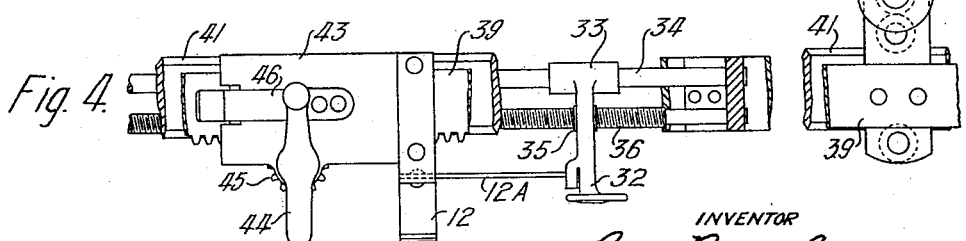
INVENTOR
Percy Robert Leslie
BY Dowell & Dowell
ATTORNEYS Patented Sept. 8, 1931

1,821,941

UNITED STATES PATENT OFFICE

PERCY ROBERT LESLIE, OF ESSENDON, VICTORIA, AUSTRALIA

MECHANISM FOR THE MECHANICAL COMPUTATION AND THE RECORDING OF LABOR COSTS

Application filed August 23, 1928, Serial No. 301,548, and in Australia August 26, 1927.

My invention relates to the mechanical computation and recording of labour costs associated with the time occupied on each particular job and the rate of payment of the operative; and the object of my invention is to provide mechanism by which the cost of a particular job in relation to a particular operative may be mechanically determined and directly read off an indicator without the necessity for any calculations and instantly recorded on the recording means incorporated in the mechanism.

I attain this object by the mechanism illustrated in the accompanying drawings, in which Figure 1 is an elevation of the machine, portions being shown broken away.

Figure 2 is an end elevation looking from the right hand end towards the left hand end of the machine as shown in Figure 1, portions being shown broken away.

Figure 3 is a section on line 3—3 of Figure 1 but on an enlarged scale.

Figure 4 is a broken elevation of a detail, and

Figure 5 is a plan of a suitable form of conversion scale.

A rotatable drum 1 is pivotally mounted between end frames 2, the axis of rotation being on the centre line of set-screws 3. An entry blank 4 such as a sheet of paper ruled horizontally, is fastened to the drum and serves as a recording medium. The lines may be consecutively numbered and are arranged opposite to corresponding consecutive numbers marked on the drum, and a number and line are allotted to each operative.

At the right hand end of the drum a spider 5, which supports the drum and is rotatable therewith, carries shoes 6 which may be five in number. Each shoe has a slot 7. The shoes rotate beneath and just clear of an arc plate 8 having a series of numbered holes 9 arranged in five columns. The path of each shoe is directly under a corresponding column of the numbered holes so that a plug 10 inserted through one of these holes will enter eventually into the slot of the shoe corresponding to that column of holes and thus will lock the drum so that the operative's line corresponding to the number of that hole is brought into the recording position and locked therein. Thus in Figure 2 the plug 10 is shown inserted in the hole which would lock the drum in the recording position for the operative having or designated by the number 1 as shown in Figure 1. The marking arm 12 is then above the line allotted to said operative identified by the number 1.

A flanged disc 13 attached to the spider 5 and rotating therewith has radial slots 14 in which threaded bolts 15 may be made fast at radial distances from the periphery, proportional to the rate of pay of the operative. Consequently, when the drum is set and locked by inserting plug 10 in the hole corresponding to a particular operative, a slot with its stop corresponding to the rate of pay of that operative is brought into a predetermined peripheral position with the object of setting a conversion scale in a predetermined peripheral position relatively thereto according to the rate of pay of that particular operative as hereinafter described.

A fixed cylinder 16 houses a rotatable cylinder 17 pivotally mounted at the cylinder ends 18 and having its axis parallel to the axis of the rotatable drum. The cylinder 17 carries on its surface a helical scale 19 shown in detail in Figure 5. This scale may be such that its upper edge is divided into the number of spaces corresponding to the maximum daily rate of pay of operatives in that particular factory and its lower edge into the number of spaces corresponding to the minimum rate of pay.

The scale in Figure 5 is a money time scale so constructed as to facilitate the conversion of elapsed time into equivalent money values.

The horizontal boundaries of the scale will be referred to as its length and the vertical boundaries as its width.

The length is made equal to the full distance traversed during working hours by lever 32 and the indicating means co-acting therewith as hereinafter described. The scale is constructed as a rectangle having a length determined as aforesaid and width which may be one half the length. Narrow marginal spaces are provided outside the vertical sides of the rectangle.

The lower edge of the rectangle is divided into six major divisions numbered consecutively. Each such division is subdivided into quarters. The right hand side of the rectangle is produced upwards to a point the distance of which from the upper edge of the scale bears the same ratio to its distance from the lower edge as 6 bears to 10.75. Lines directed towards said point are now drawn from each of the said divisions until they intersect the upper edge, the lines through major divisions bearing the same identifying numbers. Six major divisions are thus produced on the upper edge and 4.75 additional major divisions can now be marked off on the left hand portion of said upper edge making 10.75 equal divisions in all and these are of lesser length than divisions along the lower edge. The scale is completed by drawing lines, radiating from the point aforesaid, to join the said additional divisions to the left hand boundary of the scale.

The scale thus constructed is adapted for a factory in which the lowest daily rate is 6 dollars per day and the highest 10.75 dollars. Scales may be constructed so that the length is divided so as to be adapted to the maximum or minimum rates of pay, and it is obvious that the major divisions can be subdivided into as many equal minor divisions as desired.

It is obvious that any line drawn between said upper and lower edges of the scale and parallel thereto would be divided into equal divisions comprising not more than 10.75 nor less than 6 major divisions and any such line will have a greater or less number of equal divisions in proportion as it is drawn nearer the upper or lower edge. An imaginary line of this nature may therefore be selected having divisions equal in number to the rate of pay of any particular operative receiving between 6 dollars and 10.75 dollars per day. Consequently if any portion of the travel of marking arm 12 coacting with clock driven lever 32 be referred to the scale as hereinafter described it will afford a ready means of converting elapsed time into monetary values. The said scale may be wrapped around cylinder 17 and the division lines will then become helices of uniformly increasing pitch.

Means are provided for selectively locking said cylinder as hereinafter described so that indicator 42 will traverse any desired path parallel to the length of the scale along which the total number of divisions corresponds with the rate of pay of the operative whose job cost is desired. On traversing any proportion of its full travel from its zero position, said indicator will evidently stop at a point the scale reading of which will be a like proportion of the daily wage.

Other means are provided so that immediately on the completion of any job the marking arm 12 and indicator 42 may be moved as one unit over a distance proportional to the elapsed time thereon when the reading of the scale under said indicator 42 will be the monetary value of said elapsed time.

Rack 24, carried by slippers 25 sliding on guide 26, engages with pinion 27 attached to the spindle of the conversion scale and thus the extent of movement of the rack determines the setting of the conversion scale. This rack 24 carries an offset arm 28 which traverses that one of the slots 14 which has been locked in its path and thus the movement of the offset arm and consequential setting of the conversion scale is determined by the position of the stop 15, and this position is predetermined by the rate of pay of a particular operative, being nearer the periphery proportionally as the particular rate of pay approaches the minimum rate provided for and showing on the conversion scale. All computations relative to said operative are made with offset arm in contact with stop 15 of the slot devoted to him.

The upper slipper 25 carries a projection 29 which is gripped by retaining spring 30 when the rack is in its extreme upper position and thus the arm 28 is held clear of the disc 14 when the drum is to be rotated to positions allotted to other operatives.

The motion of the rotary scale and its associated mechanism above described is controlled by lever 31 so that the attendant can immediately on the completion of every job bring the conversion scale to the position appropriate to any operative when making cost entries provided that the drum 1 has previously been locked in the position allotted to said operative by means of plug 10 as aforesaid. Lever 31 is connected to toothed sector 20 which is pivoted on pin 21 and engages pinion 23 attached to the left hand end (Figure 1) of the conversion scale. Consequently, when the lever 31 is raised the offset arm 28 of the rack is lowered into a slot 14 until its movement is limited by a stop 15 of that particular slot, and when the lever is lowered the offset arm is raised out of the slot.

A lever 32 attached to a sliding member 33 sliding on rod 34, brings an internally threaded part 35 into engagement with threaded rod 36. Rod 36 receives rotary motion by clockwork 36A through worm 37 and wheel 38. The rotation of the rod 36 is in such a direction that the sliding member 33 is carried towards the right hand side of the entry blank. The motion of the lever 32 is accordingly proportional to the elapsed time and its path is parallel to the axis of the rotary scale. When it is desired to bring the lever 32 back to the starting position, such as at the commencement of a day, the lever is lifted until the threaded part 35 is out of engagement with the threaded rod 36 and the sliding member 33 may then be moved back to the starting point at the left hand side of the entry blank. A stop No. 1 shown in the drawings defines said starting point.

As the conversion scale has been set so as to correspond to the pay of the particular operative in question and the lever 32, at the completion of a job, has moved laterally through a distance proportional to the elapsed time, the cost of the job in relation to that operative is read off the conversion scale by movement of an indicator 42 along the conversion scale over a distance equal to the distance travelled by the lever 32 during the performance of the job. This movement of the indicator 42 is effected mechanically as follows:—

A cursor 43 is driven along a toothed bar 39 under the action of a lever 44 and toothed wheel 45. Its action is restrained by spring 46 pressing on the bar 39 to prevent accidental movement. The cursor 43 carries a marking arm 12 and distance piece 12A which is brought into contact with the lever 32 when a cross stroke is to be made across any operative's line by means of a pen or pencil drawn along the right hand edge of the marking arm. The cursor is then in that position on the operative's line which corresponds to the moment of completion of the job, and the indicator 42 lies on the zero mark of the conversion scale. The indicator 42 is carried by the toothed bar 39 and this bar is carried by rollers 40 running on a fixed bar 41 so that the bar 39 together with the cursor and indicator 42 may be moved as a unit towards the left hand side of the entry blank until the arm 12 is in the position where the commencement of the job is indicated on the operative's line by the initial cross-stroke which normally is drawn at the moment of commencement of the job.

As the arm 12 has moved along the operative's line for a distance proportional to the time which has elapsed on the job it is obvious that the indicator 42 has moved over the same distance and, as the conversion scale 19 has been set to conform with the pay of that particular operative, the cost of the job is indicated on the conversion scale by the position which the indicator 42 now occupies. The cost thus determined may be entered upon the entry blank. An arm rest 47 is provided for the convenience of the attendant.

The convenience of the mechanism in factory costing will be appreciated from an example of its application. Let it be supposed that operative No. 1 has completed job No. 20 at 2 o'clock in the afternoon and is about to start on job No. 21. The commencement of job 21 is recorded and cost of the completed job 21 determined and entered in the following manner. The clock hand will indicate the hour of two o'clock and lever 32 will have traversed its path to the position corresponding to that hour of day. The plug 10 is inserted in hole No. 1 and the drum rotated until checked by said plug when the line devoted to operative No. 1 comes into the recording position under the marking arm 12. Cursor 43 is now moved to the right by operating lever 44 until distance piece 12A contacts with lever 32. In this position corresponding to two o'clock a cross stroke is drawn by pencil or other marking instrument along the right hand edge of marking arm 12 across entry line No. 1. This mark registers graphically the instant of change of job. The new job number 21 is entered adjacent to the cross stroke.

The cost of the previous job 20 is now determined and entered as follows. Lever 31 is raised so causing offset arm 28 to move down the particular slot 14 corresponding to operative No. 1 until checked by stop 15. This movement has rotated the cylinder 17 carrying the scale 19 to the peripheral position corresponding to the rate of pay of operative No. 1. Toothed bar 39 carrying indicator 42 and cursor 43 carrying marking arm 12 are now moved as one unit to the left until the right hand edge of marking arm 12 is exactly over the last cross stroke on the entry line of operative No 1 which was drawn when job No. 20 was commenced. The said cross stroke having been made at the precise moment of commencing job 20 it is evident that the extent of the movement of marking arm 12 between the two cross strokes and consequently the extent of the movement of indicator 42 along scale 19 are proportional to the time spent on job 20 and indicator 42 will point to the particular division on the scale registering the monetary value of the elapsed time or cost of the job. The scale reading so indicated is accordingly entered adjacent to the cross stroke and to the previously recorded job No. 20. The indicator 42 is now returned to zero to await the next entry.

It will be seen that complete records of all jobs and their cost for the 50 operatives for which holes have been provided in arc plate 8 can be made on the entry blank for a daily period. A new blank may be fixed on the drum daily and such blanks become permanent records of the day's job costs from which other records or statistics may be compiled.

I claim:

1. In mechanism for the mechanical computation and the recording of labour costs, the combination of an entry blank, means for setting that portion of said entry blank allotted to the particular operative in question and the remainder of the mechanism in working relationship to each other, time-regulated means actuated uniformly with the lapse of time during working hours, conversion means adapted to be set to conform to the rate of pay of any operative for the conversion of the movement of the time regulated means as related to said operative's jobs into equivalent monetary values, and indicating means actuated in relation to said conversion means to an extent equivalent to the actuation of the time regulated means.

2. In a device for mechanically computing and recording labor costs according to the time and rate of an operative's pay, a carrier for an entry blank means for setting the carrier with the blank in a predetermined position for each operative denominated on the blank; a set of stops positioned on the carrier according to the rate of each operative's pay; an independently movable conversion scale graduated from the lowest to the highest rate of operatives' pay; means for moving said scale for an extent dependent upon the setting of the stop for each operative; means movable lineally in relation to said carrier for an extent corresponding to a working day and driven by clock mechanism controlling its advance; and means shiftable parallel to the first-named means and limited by the advance of the former carrying an indicator moving over said scale and a marker moving over the blank carrier for denoting and marking the blank with the labor costs for time expenditure of a particular operative on a piece of work.

3. In a device for mechanically computing and recording labor costs of work according to the wage and time expenditure of operatives, a support; a rotatable drum journaled on the support and carrying an entry sheet on which various operatives are denominated; radial slots in the ends of the drum corresponding with the spaces denominating the various operatives; stops set in said slots according to the rate of pay of each operative; an independently rotatable conversion scale graduated from the lowest to the highest pay rate of the operatives; means rotating said conversion scale through an arc dependent upon the setting of the stop in the slot of each operative; a stop lever movable lineally over the sheet carrying drum for an extent corresponding with a working day; clock mechanism driving and regulating the advance movement of said lever from a zero setting; and means shiftable by hand parallel to said stop lever's path and limited by the advance movement of the latter carrying an indicator moving over said scale and a marker moving over the drum for denoting and marking on the entry sheet the labor cost of work according to the time expenditure and wage rate of any operative for which the device is set.

4. In mechanism for the mechanical computation and the recording of labor costs, the combination of a carrier for an entry blank; means for setting the carrier with that portion of the blank allotted to a particular operative in working relation to other parts of the mechanism; a rotatable conversion scale; means for rotating said scale through an arc of extent depending upon a stop setting on the carrier for each operative according to his rate of pay; means movable by clock mechanism in lineal direction over the carrier for an extent proportional to lapse of time; and indicating means movable parallel to the first-named means for an extent determined by the movement of the former.

5. In mechanism for the mechanical computation and the recording of labor costs, the combination of a drum carrying an entry blank; means rotatably supporting said drum; an end disk carried by said drum having radial slots therein registering with the spaces allotted to the respective operatives denominated on the entry blank; stops set in said slots of the end disk according to the wage of each operative; scale setting means slidable in said slots and limited in movement by said stops; a rotatable conversion scale actuated by said means through connecting gear; slotted indexing means rotatable with said drum; a stationary arc plate above said slotted indexing means having a series of indexing holes corresponding to the various operatives; a plug passable through said indexing holes and engaging one of the indexing slots for setting the mechanism for any operative; a stop lever driven by clock mechanism in lineal movement over said drum for an extent corresponding to a working day; and indicator means movable relatively to said stop lever and limited by the advance of the former for simultaneously denoting the time expenditure and cost of labor for work of any operative for which said drum and conversion scale are relatively set.

6. In mechanism for the mechanical computation and the recording of labor costs, the combination of a rotable drum carrying an entry blank on its periphery denoting a a plurality of operatives; a clock work; means moved lineally by said clock work over said drum for an extent corresponding to a working day; a rotatable conversion scale graduated from the lowest to the highest wage of any operative and adapted to be set to a position corresponding with the pay rate of any operative; indexing means limiting the rotation of said drum and the movement of said conversion scale and locking the two relatively in setting for any operative; and indicator means movable along the conversion scale and said drum for an extent corresponding to the time advance of the first-named means for simultaneously denoting the time expenditure and labor cost for work by the operative for which the mechanism is set.

7. In mechanism for the mechanical computation and the recording of labor costs for work of different operatives, the combination of a rotatable drum carrying an entry blank denominating the various operatives; time-regulated means movable lineally in relation to said drum; a conversion scale graduated from the lowest to the highest pay rate of the operatives and movable to positions denoting the pay rate of any operative; an indicator movable relatively to said scale for an extent determined by the movement of said time-regulated means, a stationary member perforated with a series of indexing holes; an end member rotatable with said drum; a plug passable through said indexing holes and said slots in the end member for setting the drum according to the operative whose costs are to be computed; a radially slotted member rotatable with said drum; adjustable stops in said slots thereof; and scale-setting means slidable in said radial slots and limited by said stops.

8. In mechanism for the mechanical computation of labor costs for work of operatives at different rates of pay; the combination of means for holding an entry blank; a plurality of rate determining means adapted to be adjusted and set conformably to the rate of pay of any of a group of operatives; time-regulated means actuated uniformly through a lapse of time; a conversion scale adapted to be brought into working relation with said time-regulated means and said plurality of rate determining means for converting the movement of the time-regulated means as related to the different operatives into equivalent monetary values; and indicating means actuated in relation to said scale for an extent determined by the actuation of the time-regulated means.

In testimony whereof I affix my signature.

PERCY ROBERT LESLIE.